(12) United States Patent
Sugishita et al.

(10) Patent No.: US 8,059,299 B2
(45) Date of Patent: Nov. 15, 2011

(54) APPARATUS AND METHOD FOR CONTROLLING AN IMAGE-DATA IMPUT/OUTPUT PROCESS PERFORMED BY AN IMAGE FORMING APPARATUS CONNECTED TO AN IMAGE DATA INPUT UNIT AND AN IMAGE DATA OUTPUT UNIT

(75) Inventors: Satoru Sugishita, Tokyo (JP); Satoru Ohno, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 1085 days.

(21) Appl. No.: 11/896,353

(22) Filed: Aug. 31, 2007

(65) Prior Publication Data

US 2008/0062450 A1   Mar. 13, 2008

(30) Foreign Application Priority Data

Sep. 7, 2006 (JP) ................................. 2006-242914
Jul. 3, 2007 (JP) ................................. 2007-174989

(51) Int. Cl.
*G06K 15/00* (2006.01)
*G03G 15/00* (2006.01)
(52) U.S. Cl. .................... 358/1.16; 358/1.17; 399/83
(58) Field of Classification Search .............. 358/1.16, 358/1.17; 399/83
See application file for complete search history.

(56) References Cited

U.S. PATENT DOCUMENTS

| | | | |
|---|---|---|---|
| 6,603,570 B2 | 8/2003 | Asahi | |
| 6,621,592 B1 * | 9/2003 | Takayama et al. ........... | 358/1.16 |
| 6,876,466 B1 * | 4/2005 | Morikawa et al. ........... | 358/1.17 |
| 2002/0080382 A1 * | 6/2002 | Ohtsu ........................ | 358/1.14 |
| 2003/0067629 A1 | 4/2003 | Sugishita | |
| 2003/0151667 A1 * | 8/2003 | Nakami et al. .............. | 348/207.1 |
| 2004/0057066 A1 | 3/2004 | Sugishita et al. | |
| 2004/0095602 A1 | 5/2004 | Sugishita et al. | |
| 2004/0145766 A1 | 7/2004 | Sugishita et al. | |
| 2005/0024680 A1 * | 2/2005 | Tanaka ........................ | 358/1.16 |
| 2005/0268104 A1 | 12/2005 | Sugishita et al. | |
| 2006/0064297 A1 | 3/2006 | Sugishita et al. | |
| 2006/0182417 A1 | 8/2006 | Sugishita | |
| 2007/0041047 A1 | 2/2007 | Sugishita | |
| 2007/0076244 A1 | 4/2007 | Suzuki et al. | |
| 2007/0083629 A1 | 4/2007 | Sugishita | |

FOREIGN PATENT DOCUMENTS

JP           11-331529           11/1999
(Continued)

OTHER PUBLICATIONS

Japanese Office Action dated Jul. 19, 2011, issued in Application No. 2007-174989.

*Primary Examiner* — Twyler Haskins
*Assistant Examiner* — Fred Guillermety
(74) *Attorney, Agent, or Firm* — Harness, Dickey & Pierce, P.L.C.

(57) ABSTRACT

A storage unit temporarily stores first image data input from an input device and second image data to be output to an output device. An image-data input/output processing unit performs processes of inputting the first image data from the input device and outputting the second image data to the output device. An execution-condition determining unit determines a condition for the processes of inputting and outputting the image data, and switches processing modes between a normal processing mode and a low-speed processing mode based on a determined condition.

14 Claims, 10 Drawing Sheets

FOREIGN PATENT DOCUMENTS

| | | |
|---|---|---|
| JP | 2000-094760 | 4/2000 |
| JP | 2003-008797 | 1/2003 |
| JP | 2003-341156 | 12/2003 |
| JP | 2004-104447 | 4/2004 |
| JP | 2005-079646 | 3/2005 |
| JP | 2005-110312 | 4/2005 |

* cited by examiner

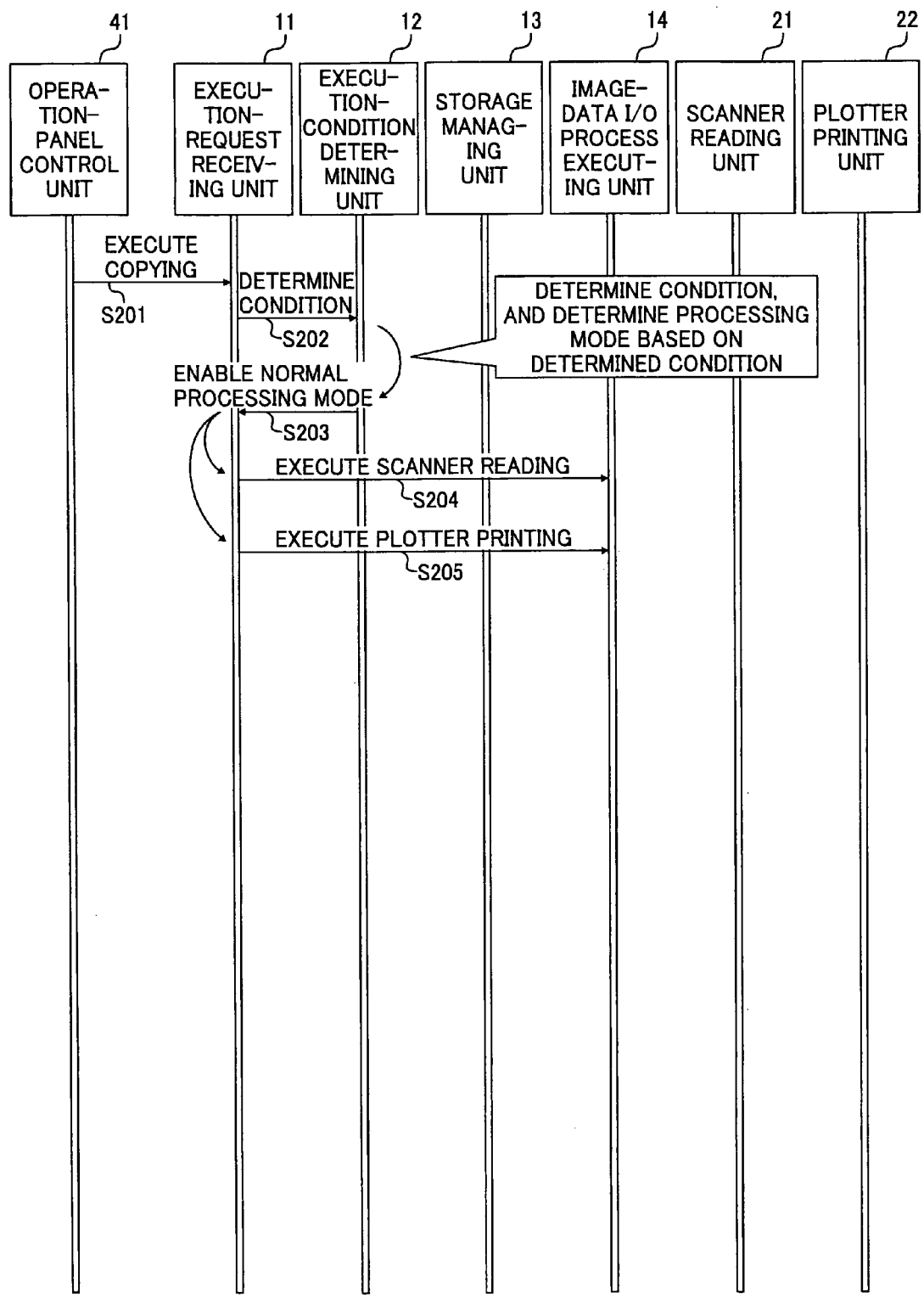

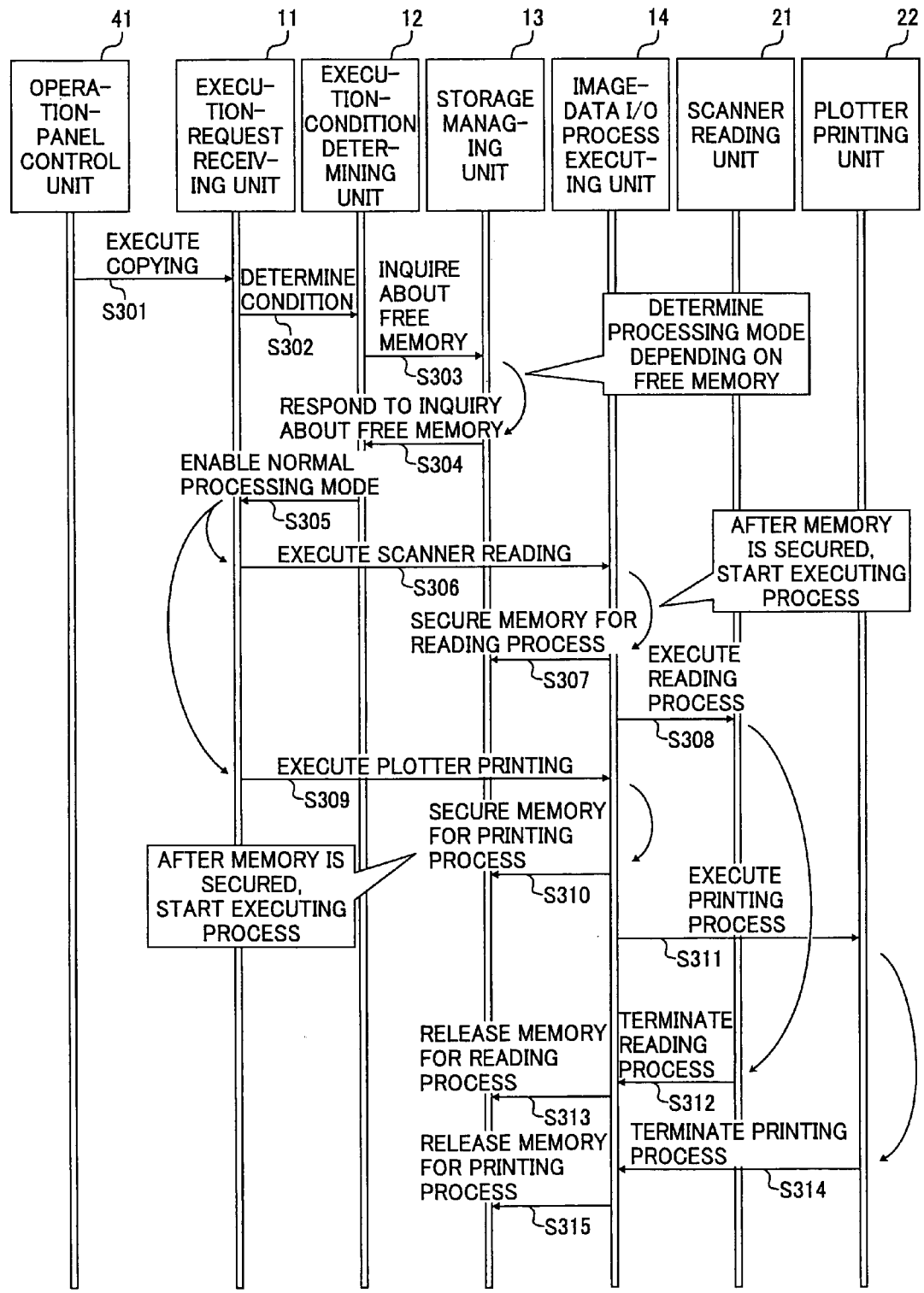

FIG. 4C
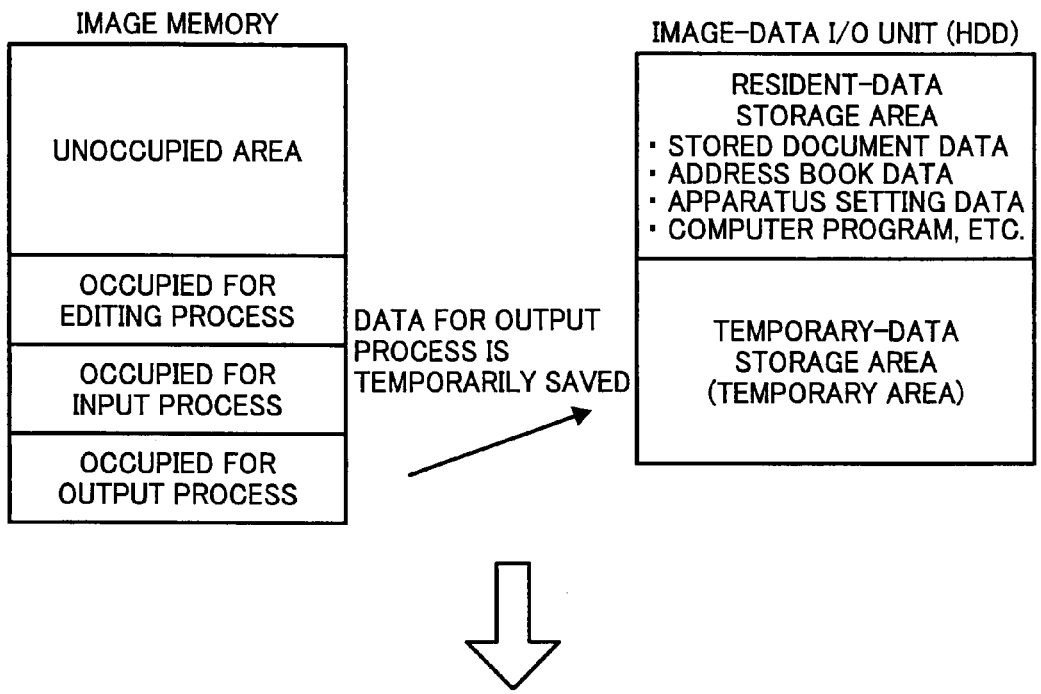
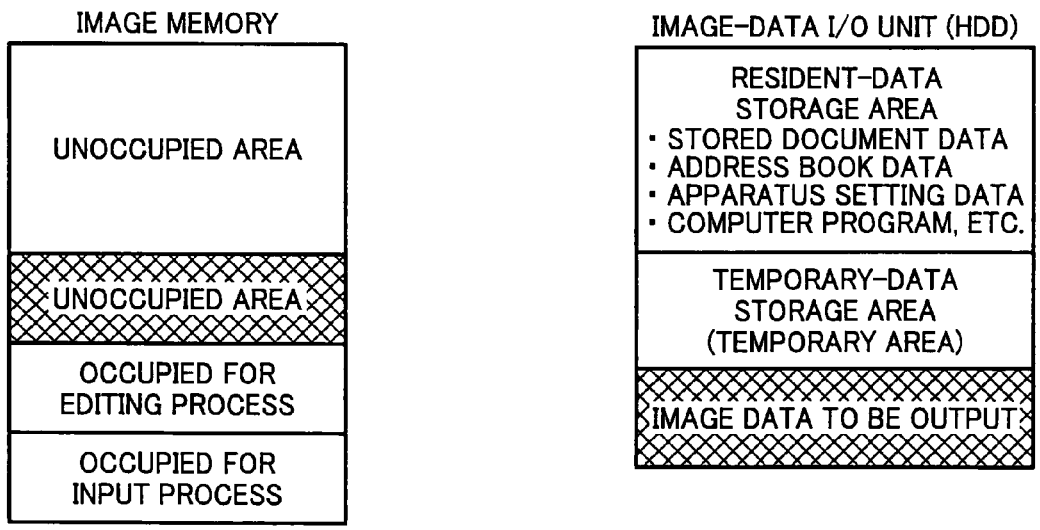

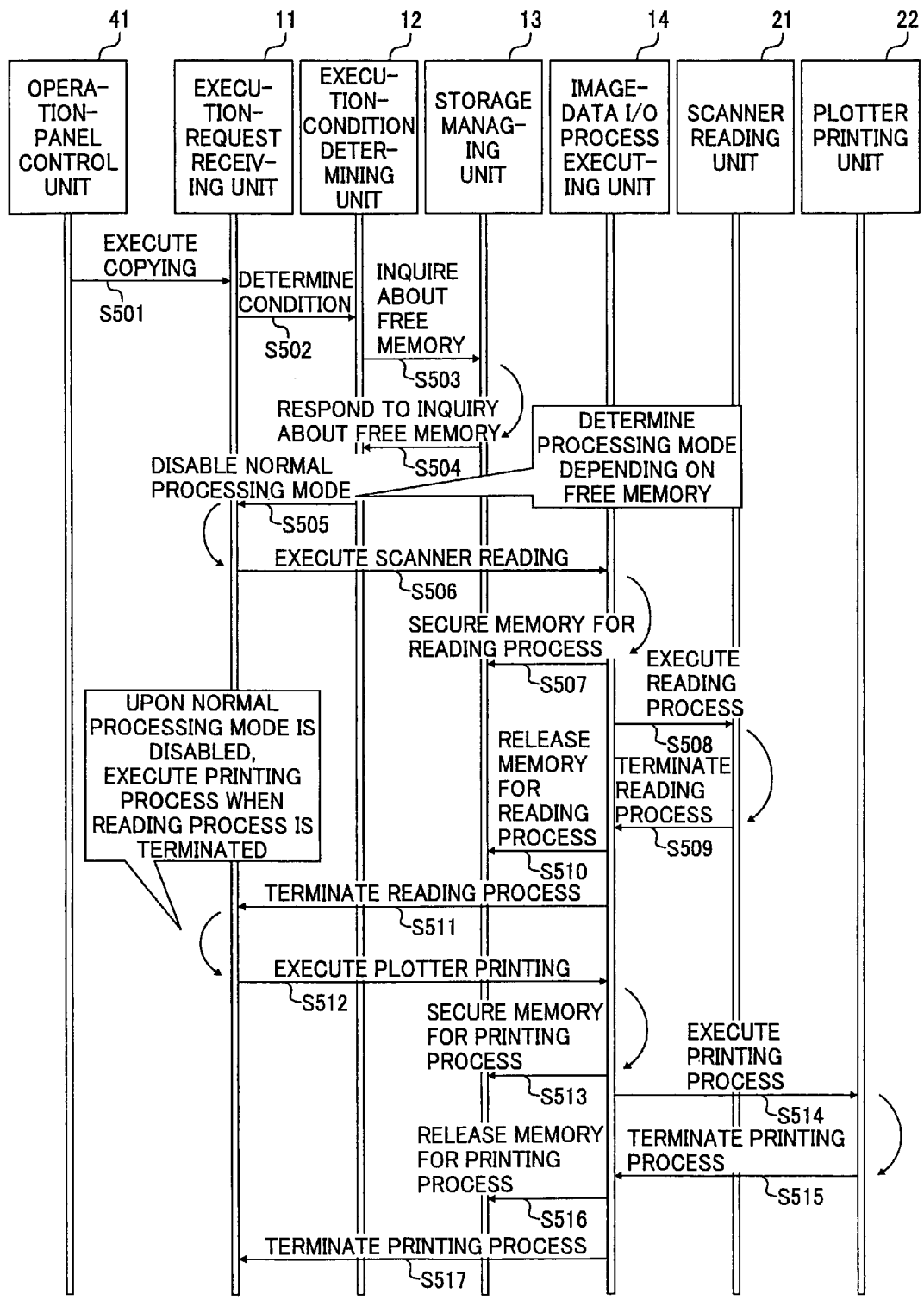

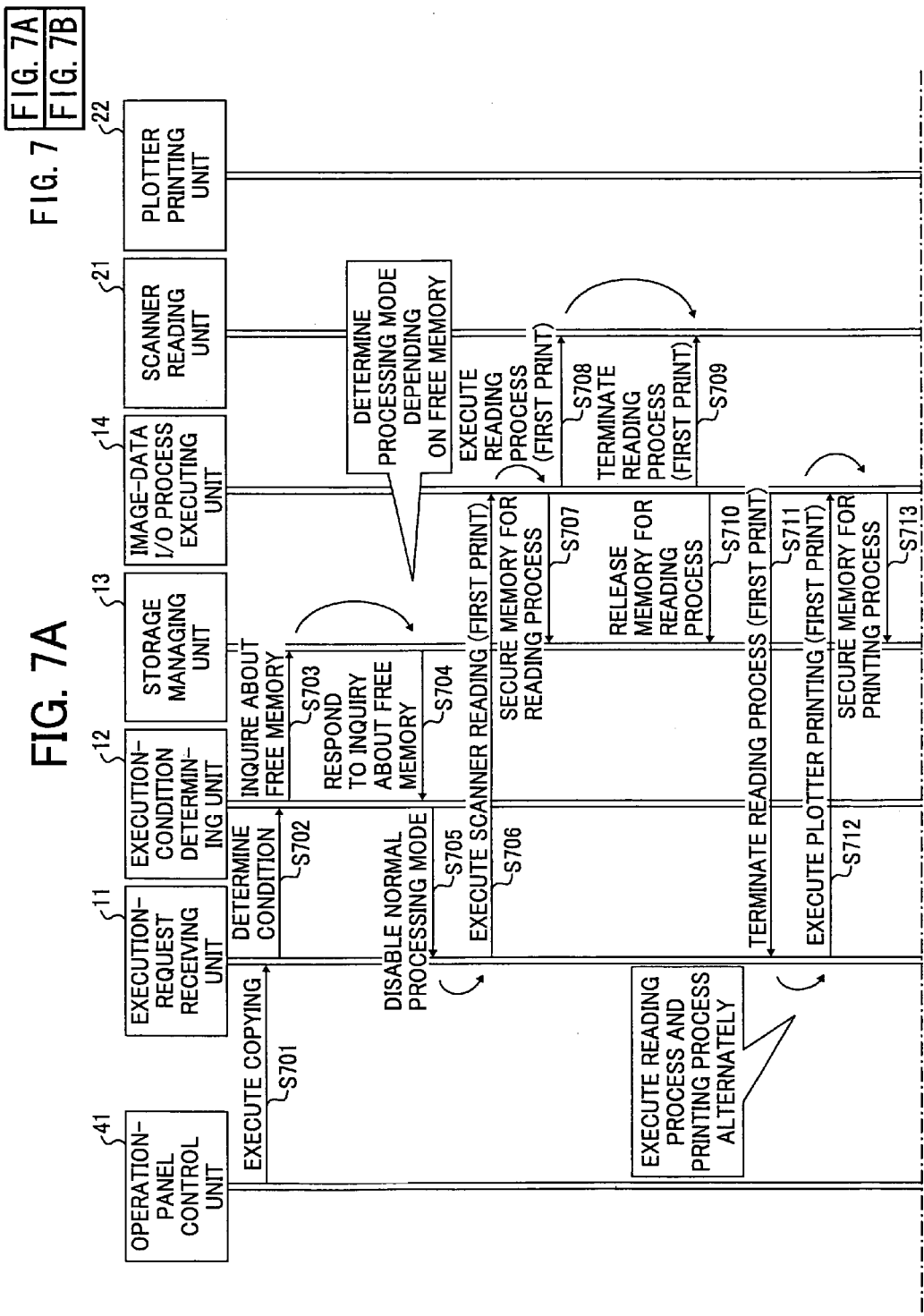

APPARATUS AND METHOD FOR CONTROLLING AN IMAGE-DATA IMPUT/OUTPUT PROCESS PERFORMED BY AN IMAGE FORMING APPARATUS CONNECTED TO AN IMAGE DATA INPUT UNIT AND AN IMAGE DATA OUTPUT UNIT

CROSS-REFERENCE TO RELATED APPLICATIONS

The present application claims priority to and incorporates by reference the entire contents of Japanese priority document, 2006-242914 filed in Japan on Sep. 7, 2006 and 2007-174989 filed in Japan on Jul. 3, 2007.

BACKGROUND OF THE INVENTION

1. Field of the Invention

The present invention relates to a technology for controlling an image-data input/output process performed by an image forming apparatus connected to an image-data input unit such as a scanner and an image-data output unit such as a plotter.

2. Description of the Related Art

An image forming apparatus, which is connected to an image-data input unit such as a scanner and an image-data output unit such as a plotter, is configured to receive image data from the scanner and output the image data to the plotter. At this time, the image forming apparatus can perform a process of reading the image data received from the scanner (hereinafter, "a reading process") in parallel with a process of outputting the image data to the plotter for printing out an image (hereinafter, "a printing process"). However, when a data size is large, the image forming apparatus may fail to perform the above processes in parallel. For example, in a case where a capacity of a page memory is insufficient, if most of the page memory is used for the printing process, the image forming apparatus may fail to perform the reading process in parallel with the printing process due to structural limits of a system. Consequently, a job productivity of the image forming apparatus is degraded.

To solve the problem, various image forming apparatuses have been developed. For example, an image forming apparatus disclosed in Japanese Patent Application Laid-open No. 2005-79646 is configured to assign a unique image identifier (ID) to each parameter indicating a request for an execution of an image-data input/output process. Therefore, an image-data input/output process to be executed next can be selected based on an image ID assigned to a parameter indicating a request for an execution of an image-data input/output process that is executed last.

A technology for using a common image format regardless of type of an image-data input/output device such as the scanner and the plotter has recently proposed. The common image format is generally represented by a red-green-blue (RGB) color space. However, RGB data requires a relatively large memory size, so that the RGB data is generally compressed into a joint photographic experts group (JPEG) format. However, as there are plural types of image data, sizes of compressed image data differ from one another depending on the types of the image data.

Furthermore, there has been developed an image forming apparatus to which a plurality of image-data input/output devices is connected, such as a printer, a facsimile, a World Wide Web (Web) application, an image storage medium (a secure digital (SD) card or the like), and a document box stored in a hard disk drive (HDD), in addition to the scanner and the plotter. If various combinations of the above image-data input/output devices are considered, the number of types of the image-data input/output devices becomes enormous. Moreover, there are various types of image forming apparatuses in all price ranges from low-end to high-end. Therefore, performances of the image forming apparatuses including a memory size are variously different from one another.

In this manner, when the image forming apparatus performs an image-data input/output process, wide range of conditions should be met for processing the image-data input/output process, such as a type of image data, a specification of an image-data input/output device where the image data is input/output, a state of the image forming apparatus, and the like. Under such circumstances, the method disclosed in Japanese Patent Application Laid-open No. 2005-79646 cannot be appropriately applied to a practical use. Therefore, there has been expected to achieve an image forming apparatus capable of optimally-dealing with the wide range of conditions for processing the image-data input/output process.

SUMMARY OF THE INVENTION

It is an object of the present invention to at least partially solve the problems in the conventional technology.

An image forming apparatus according to one aspect of the present invention includes a storage unit that temporarily stores therein first image data input from an input device and second image data to be output to an output device; an image-data input/output processing unit that performs processes of inputting the first image data from the input device and outputting the second image data to the output device; and an execution-condition determining unit that determines a condition for the processes of inputting and outputting the image data, and switches processing modes between a normal processing mode and a low-speed processing mode based on a determined condition. If the condition does not fulfill a speed-degradation condition for determining whether predetermined areas for the image data can be secured in the storage unit, the execution-condition determining unit switches to the normal processing mode in which the areas for the image data are secured in the storage unit. If the condition fulfills the speed-degradation condition, the execution-condition determining unit switches to the low-speed processing mode in which either one of the areas for the image data is partially or fully secured after releasing an area secured in a last process.

A method of controlling inputting and outputting image data according to another aspect of the present invention includes processing inputting image data from an input device and outputting image data to an output device; and determining including determining a condition for processes of inputting and outputting the image data, and switching processing modes between a normal processing mode and a low-speed processing mode based on a determined condition. If the condition does not fulfill a speed-degradation condition for determining whether predetermined areas for the image data can be secured in the storage unit, the determining includes switching to the normal processing mode in which the areas for the image data are secured in the storage unit. If the condition fulfills the speed-degradation condition, the determining includes switching to the low-speed processing mode in which either one of the areas for the image data is partially or fully secured after releasing an area secured in a last process.

An image forming apparatus according to still another aspect of the present invention includes a storing means for temporarily storing therein first image data input from an input device and second image data to be output to an output device; an image-data input/output processing means for performing processes of inputting the first image data from the input device and outputting the second image data to the output device; and an execution-condition determining means for determining a condition for the processes of inputting and outputting the image data, and switching processing modes between a normal processing mode and a low-speed processing mode based on a determined condition. If the condition does not fulfill a speed-degradation condition for determining whether predetermined areas for the image data can be secured in the storing means, the execution-condition determining means switches to the normal processing mode in which the areas for the image data are secured in the storing means. If the condition fulfills the speed-degradation condition, the execution-condition determining means switches to the low-speed processing mode in which either one of the areas for the image data is partially or fully secured after releasing an area secured in a last process.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a flowchart for explaining basic processing procedures performed by the image forming apparatus;

FIG. 3 is a flowchart for explaining processing procedures performed by the image forming apparatus in a case where a free memory is used as a condition for determination;

FIG. 4C is a schematic diagram for explaining a case where image data stored in a predetermined portion of the image memory is temporarily saved in the HDD;

FIG. 5 is a flowchart for explaining a case where the image forming apparatus performs an input process (a reading process) prior to an output process (a printing process);

DETAILED DESCRIPTION OF THE PREFERRED EMBODIMENTS

Exemplary embodiments of the present invention are explained in detail below with reference to the accompanying drawings. The present invention is not limited to the embodiments.

Figure 1:
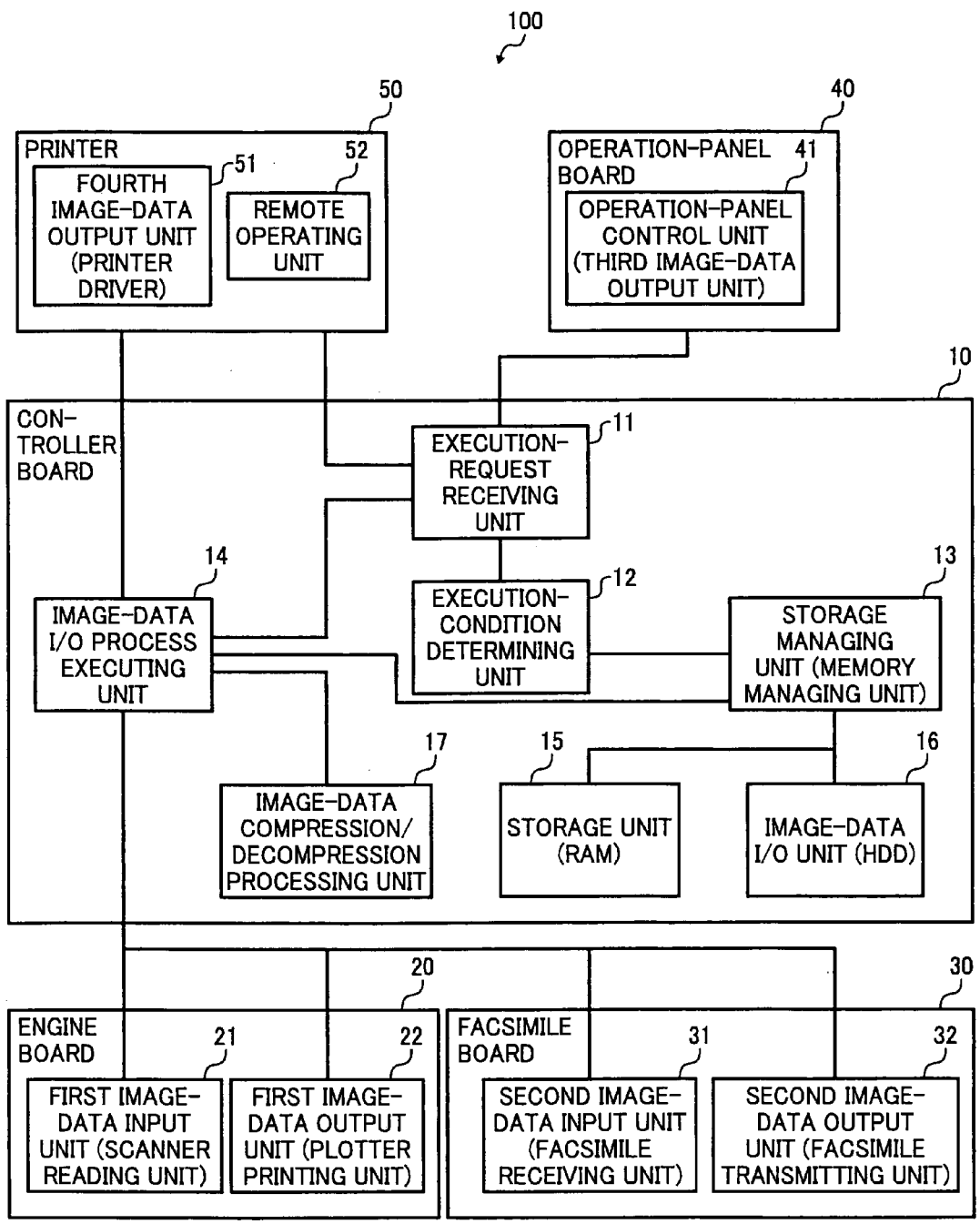
FIG. 1 is a block diagram of an image forming apparatus according to an embodiment of the present invention.

FIG. 1 is a block diagram of an image forming apparatus 100 according to an embodiment of the present invention. The image forming apparatus 100 includes a controller board 10, an engine board 20, a facsimile board 30, and an operation-panel board 40. The controller board 10 is connected to the engine board 20, the facsimile board 30, and the operation-panel board 40. The image forming apparatus 100 is connected to a printer 50.

The controller board 10 includes an execution-request receiving unit 11, an execution-condition determining unit 12, a storage managing unit (a memory managing unit) 13, and an image-data input/output (I/O) process executing unit 14. The storage managing unit 13 is connected to a storage unit (a random access memory (RAM)) 15 and an image-data I/O unit (a hard disk drive (HDD)) 16. The image-data I/O process executing unit 14 is connected to an image-data compression/decompression processing unit 17.

The engine board 20 includes a first image-data input unit (a scanner reading unit) 21 and a first image-data output unit (a plotter printing unit) 22. The facsimile board 30 includes a second image-data input unit (a facsimile receiving unit) 31 and a second image-data output unit (a facsimile transmitting unit) 32. The operation-panel board 40 includes an operation-panel control unit (a third image-data output unit) 41. The printer 50 includes a fourth image-data output unit (a printer driver) 51 and a remote operating unit 52.

The execution-request receiving unit 11 receives a request for executing an image input, such as an "execution of copying", from the printer 50. The request includes a type and a size of image data, information on a device where the image data is output, and the like. Some of the information included in the request is used as a condition for inputting/outputting the image data. The image-data I/O process executing unit 14 is connected to the engine board 20 and the facsimile board 30, and outputs image data to or receives image data from the engine board 20 or the facsimile board 30. The execution-condition determining unit 12 determines a condition for inputting/outputting image data, such as a type of the image data, a target device where the image data is input/output, a state of the image forming apparatus 100, and the like, and then determines a process to be executed based on the condition. The storage managing unit 13 saves image data in the RAM 15 if necessary when the image data is input/output. If the image data is to be input/output to the HDD 16, the storage managing unit 13 saves the image data in the HDD 16.

FIG. 2 is a flowchart for explaining basic processing procedures performed by the image forming apparatus 100. Upon receiving a request for an execution of inputting an image from a user, the operation-panel control unit 41 issues the request, in this case, for an "execution of copying" to the execution-request receiving unit 11 (step S201). Upon receiving the request for the "execution of copying" from the operation-panel control unit 41, the execution-request receiving unit 11 requests the execution-condition determining unit 12 to determine a condition for outputting image data (step S202). The execution-condition determining unit 12 determines the condition, and then determines a processing mode of a process to be executed based on the determined condition. Specifically, if the execution-condition determining unit 12 determines that the condition does not fulfill a condition causing a degradation of the processing speed (hereinafter, a "speed-degradation condition"), the execution-condition determining unit 12 determines that the process is to be executed in a normal processing mode. If the execution-condition determining unit 12 determines that the condition fulfills the speed-degradation condition, the execution-condition determining unit 12 determines that the process is to be executed in a low-speed processing mode. In this case, the speed-degradation condition is used for determining whether a predetermined area for the image data can be secured in the RAM 15 when the image data is to be input/output. If the image-data I/O process executing unit 14 performs an image-data I/O process in the low-speed processing mode, an area for an image data size required for the image-data I/O process is fully or partially secured in the RAM 15. Even when the area is released upon termination of the image-data I/O process, another area required for other process is secured in the RAM 15. Therefore, the processing speed in the low-speed processing mode is slower than that is in the normal processing mode. However, various processes can be performed even though a capacity of the RAM 15 is insufficient. On the other hand, if the image-data I/O process executing unit 14 performs the image-data I/O process in the normal processing mode, both areas required for the image-data input process and the image-data output process are secured in the RAM 15.

If the execution-condition determining unit 12 determines that the processes can be executed in the normal processing mode, the execution-condition determining unit 12 notifies the execution-request receiving unit 11 of a result of the determination (step S203). Upon receiving the result from the execution-condition determining unit 12, the execution-request receiving unit 11 notifies the image-data I/O process executing unit 14 of an execution of scanner reading (step S204) and an execution of plotter printing (step S205) in the normal processing mode.

Figure 4A:
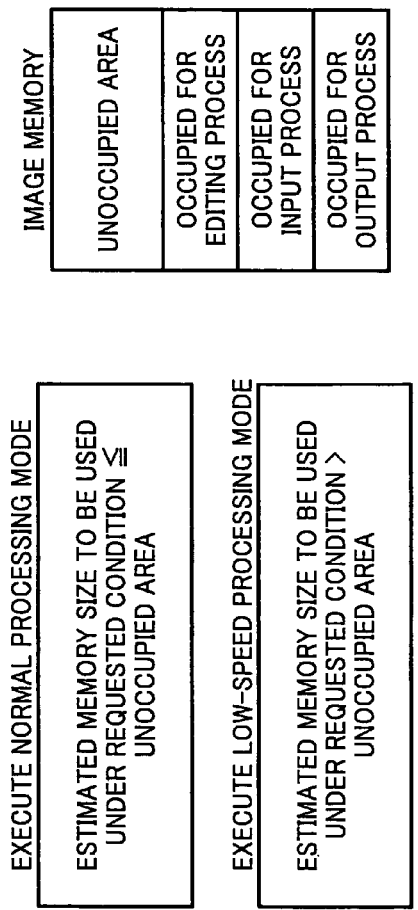
FIG. 4A is a memory map of an image memory.

FIG. 3 is a flowchart for explaining processing procedures performed by the image forming apparatus 100 in a case where a free memory is used as a condition for determination. A processing procedure at step S301 is identical to that at step S201 in FIG. 2, so that the description of the procedure is omitted. When the execution-condition determining unit 12 is requested to determine a condition for outputting image data (step S302), the execution-condition determining unit 12 inquires about a free memory to the storage managing unit 13 (step S303). Upon receiving a response to the inquiry about the free memory from the storage managing unit 13 (step S304), the execution-condition determining unit 12 determines whether the process can be executed in the normal processing mode. As shown in FIG. 4A, an image memory included in the RAM 15 is occupied for an edit process, an input process, and an output process, and a remaining area is unoccupied. If a memory size of the unoccupied area exceeds an estimated memory size to be used for the process, which is estimated under the requested condition, the execution-condition determining unit 12 determines that the process is to be executed in the normal processing mode. If the memory size of the unoccupied area is smaller than the estimated memory size, the execution-condition determining unit 12 determines that the process is to be executed in the low-speed processing mode.

Alternatively, the estimated memory size can be obtained based on a size of non-compressed image data, the lowest compression rate of compressed image data, or a compression rate lower than the lowest compression rate by a predetermined rate (for example, 90% of the lowest compression rate).

Figure 4B:
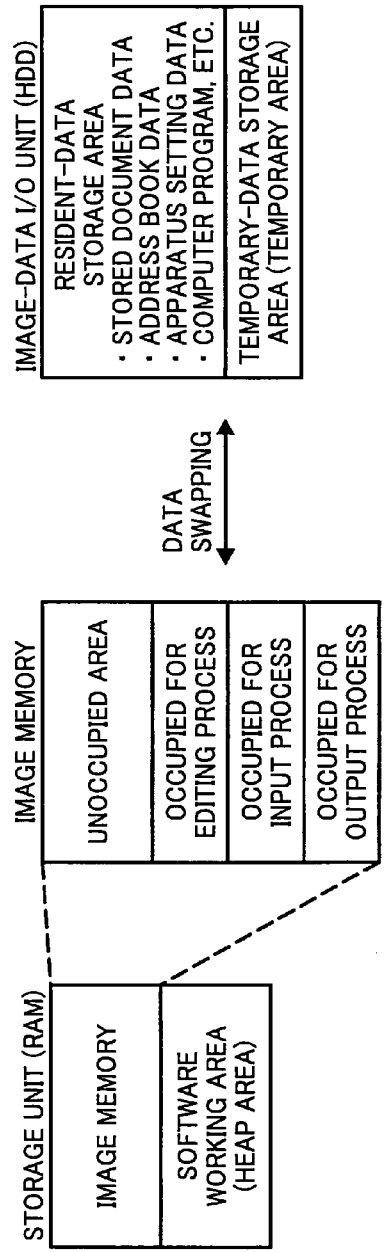
FIG. 4B is a schematic diagram for explaining an example of a relation among a random access memory (RAM), the image memory included in the RAM, and a hard disk drive (HDD)

FIG. 4B is a schematic diagram for explaining an example of a relation among the RAM 15, the image memory included in the RAM 15, and the HDD 16. The RAM 15 includes the image memory and a software working area (a heap area). The image memory includes, as described above, the area occupied for the edit process, the area occupied for the input process, the area occupied for the output process, and the unoccupied area. The HDD 16 includes a resident-data storage area and a temporary-data storage area (a temporary area). In the resident-data storage area, data on a stored document, an address book, and settings for the image forming apparatus 100, a computer program, and the like are stored therein. In the temporary-data storage area, data that cannot be stored in the image memory is temporarily stored therein.

FIG. 4C is a schematic diagram for explaining a case where image data for the output process, which is stored in the image memory, is temporarily saved in the HDD 16. The image memory is normally included in the RAM 15. However, if a capacity of the RAM 15 is insufficient for image data to be stored therein, there is a possibility that all the image memory is occupied, so that the process is to be executed in the low-speed processing mode. Consequently, it takes a long time for the image-data I/O process as compared with that is in a normal situation, and thus a user's waiting time is adversely prolonged. To solve the problem, data that is not used immediately is temporarily saved in the temporary-data storage area so that the unoccupied area in the image memory can be extended. When the data saved in the temporary-data storage area is to be used, the data is rearranged in the unoccupied area of the image memory.

In a case shown in FIG. 4C, image data for the output process is not used immediately, so that the image data is saved in the temporary-data storage area. As a result, the area occupied for the image data for the output process becomes unoccupied, and thus the total unoccupied area in the image memory can be extended. Incidentally, image data to be saved in the temporary-data storage area is not limited to the image data for the output process. As long as image data is not used immediately, any image data stored in the image memory can be temporarily saved in the temporary-data storage area. Moreover, the saved data is not limited to all image data stored in the area. For example, image data stored in the area in the image memory can be partially saved in the temporary-data storage area by each data on one image or the predetermined number of images.

To get back to the explanation of the flowchart shown in FIG. 3, when the execution-condition determining unit 12 determines that the process can be executed in the normal processing mode, the execution-condition determining unit 12 notifies the execution-request receiving unit 11 of a result of the determination (step S305). Upon receiving the result from the execution-condition determining unit 12, the execution-request receiving unit 11 notifies the image-data I/O process executing unit 14 of an execution of scanner reading (step S306) and an execution of plotter printing (step S309) in the normal processing mode. After a memory for reading the image data is secured (step S307), the image-data I/O process executing unit 14 instructs the scanner reading unit 21 to execute reading the image data (step S308). Also, after a memory for printing the image data is secured (step S310), the image-data I/O process executing unit 14 instructs the plotter printing unit 22 to execute printing the image data (step S311). The secured memory for reading the image data is released upon termination of the reading process (steps S312 and S313). Also, the secured memory for printing the image data is released upon termination of the printing process (steps S314 and S315).

FIG. 5 is a flowchart for explaining a case where the image forming apparatus 100 performs the input process (the reading process) prior to the output process (the printing process). Processing procedures at steps S501 to S504 are identical to those at steps S301 to S304 in FIG. 3, so that the description of those procedures is omitted. When the execution-condition determining unit 12 determines that the process cannot be executed in the normal processing mode, the execution-condition determining unit 12 notifies the execution-request receiving unit 11 of a result of the determination (step S505). Upon receiving the result from the execution-condition determining unit 12, the execution-request receiving unit 11 notifies the image-data I/O process executing unit 14 of an execution of scanner reading in the normal processing mode at first (step S506). After a memory for reading the image data is secured (step S507), the image-data I/O process executing unit 14 instructs the scanner reading unit 21 to execute reading the image data (step S508). Upon termination of the reading process, the scanner reading unit 21 notifies the image-data I/O process executing unit 14 of the termination of the reading process (step S509). Then, the image-data I/O process executing unit 14 releases the memory secured for the reading process (step S510), and notifies the execution-request receiving unit 11 of the termination of the reading process (step S511). When the execution-request receiving unit 11 is notified of the termination of the reading process, the execution-request receiving unit 11 notifies the image-data I/O process executing unit 14 of an execution of plotter printing (step S512) next. After a memory for printing the image data is secured (step S513), the image-data I/O process executing unit 14 instructs the plotter printing unit 22 to execute printing the image data (step S514). Upon termination of the printing process, the plotter printing unit 22 notifies the image-data I/O process executing unit 14 of the termination of the printing process (step S515). Then, the image-data I/O process executing unit 14 releases the memory secured for the printing process (step S516), and notifies the execution-request receiving unit 11 of the termination of the printing process (step S517). In this manner, in the case where the image forming apparatus 100 performs the input process prior to the output process, if the process cannot be executed in the normal processing mode because a free memory of the image forming apparatus 100 is insufficient, the reading process is performed prior to the printing process.

Figure 6:
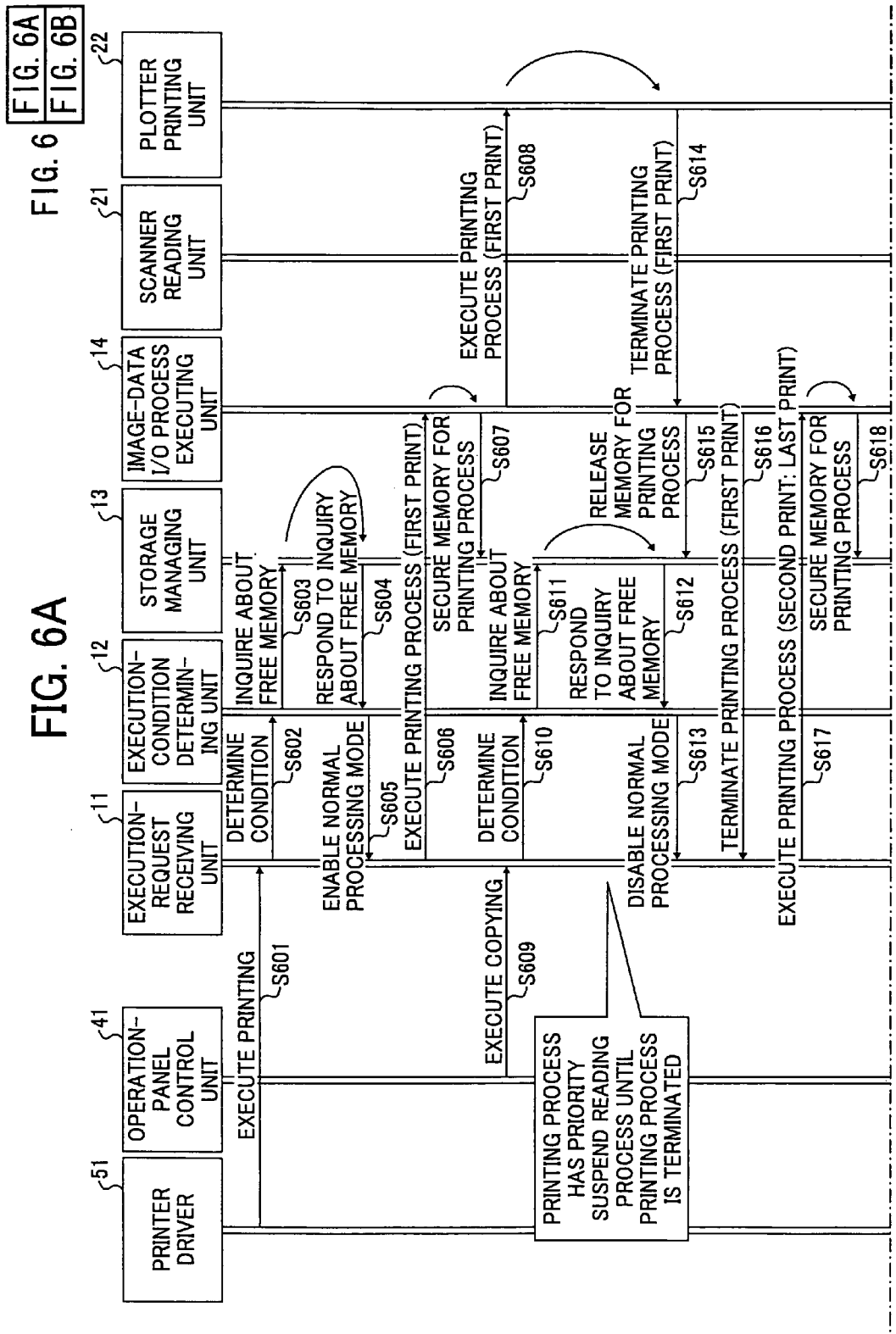
FIG. 6 is a flowchart for explaining a case where the image forming apparatus performs the output process (the printing process) prior to the input process (the reading process)
Figure 6B:
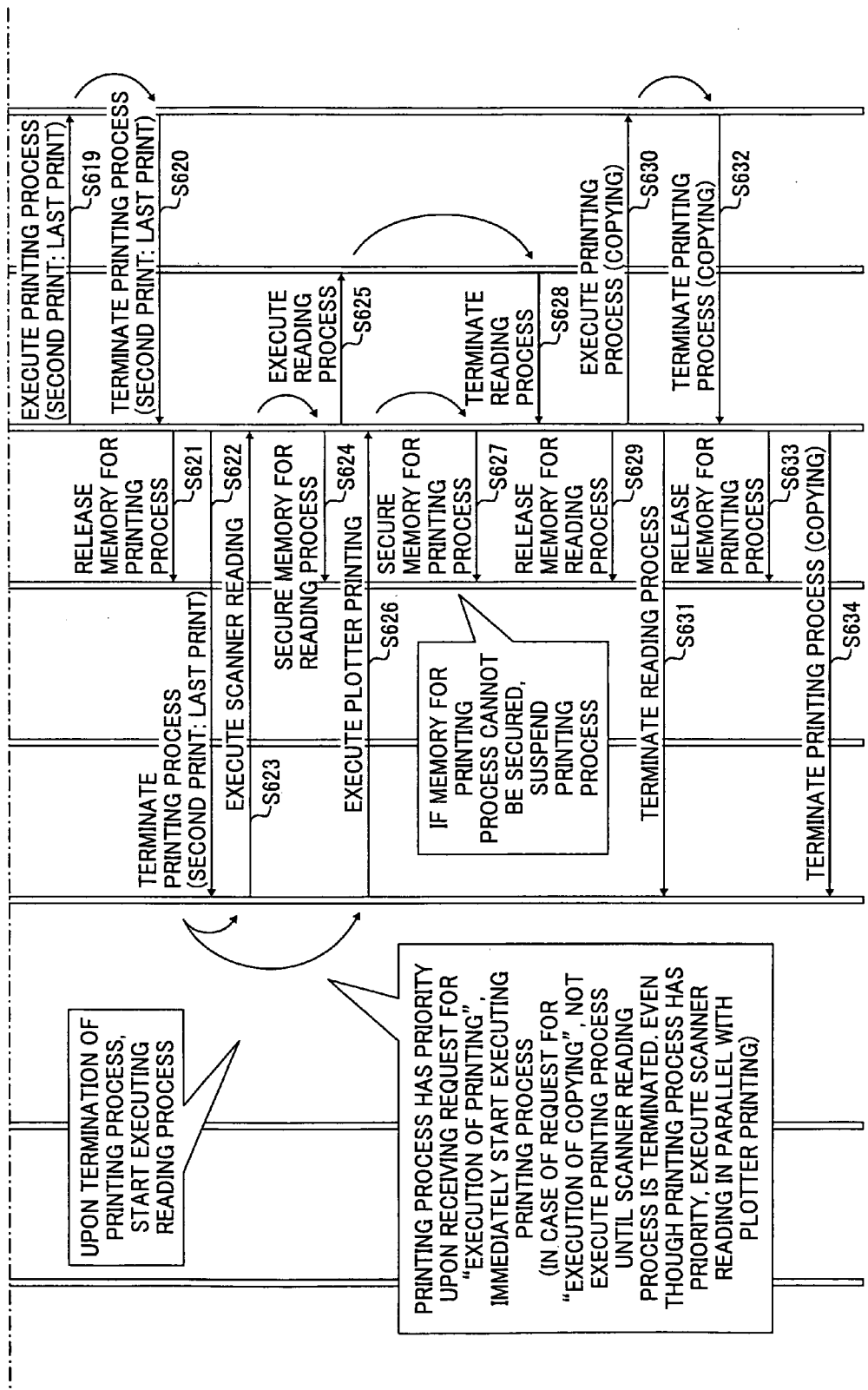

FIG. 6 is a flowchart for explaining a case where the image forming apparatus 100 performs the output process (the printing process) prior to the input process (the reading process). In this case, the printer driver 51 issues an image-input executing request indicating an "execution of printing (2 prints)" to the execution-request receiving unit 11 (step S601), and then the operation-panel control unit 41 issues the request indicating the "execution of copying" while the plotter printing unit 22 performs the printing process for the first print (steps S602 to S608). Processing procedures at steps S602 to S605 and S606 to S608 are identical to those at steps S302 to S305 and S309 to S311 in FIG. 3, so that the description of those procedures is omitted. Upon receiving the request indicating the "execution of copying" from the operation-panel control unit 41 (step S609), the execution-request receiving unit 11 requests the execution-condition determining unit 12 to determine a condition (step S610). Then, the execution-condition determining unit 12 inquires to the storage managing unit 13 about a free memory of the image forming apparatus 100 (step S611). Upon receiving a response to the inquiry about the free memory from the storage managing unit 13 (step S612), the execution-condition determining unit 12 determines that the process cannot be executed in the normal processing mode, and notifies the execution-request receiving unit 11 of a result of the determination (step S613). In this case, the printing process is performed prior to the reading process, so that the execution-request receiving unit 11 suspends the reading process until the printing process for the first print is terminated.

After the printing process for the first print is terminated (step S614), the secured memory for printing the first print is released (step S615), and the image-data I/O process executing unit 14 notifies the execution-request receiving unit 11 of the termination of the printing process for the first print (step S616). When the execution-request receiving unit 11 is notified of the termination of the printing process for the first print, the execution-request receiving unit 11 notifies the image-data I/O process executing unit 14 of an execution of plotter printing for the second print (the last print) continuously (step S617). The printing process for the second print is performed by the plotter printing unit 22 (steps S618 to S621) in the same manner as the first print. When the printing process for the second print is terminated, the image-data I/O process executing unit 14 notifies the execution-request receiving unit 11 of the termination of the printing process for the second print (the last print) (step S622). When the execution-request receiving unit 11 is notified of the termination of the printing process for the second print (the last print), the execution-request receiving unit 11 notifies the image-data I/O process executing unit 14 of an execution of scanner reading (step S623) and an execution of plotter printing (step S626) in parallel. Remaining procedures at steps S624 to S625 and S627 to S634 are identical to those at steps S307 to S308 and S310 to S315 in FIG. 3, so that the description of those procedures is omitted. When the image forming apparatus 100 performs the printing process prior to the reading process, a request for an execution of printing is basically notified immediately. However, in the case shown in FIG. 6, even though the request indicating the "execution of copying" is issued, the printing process cannot be executed until the reading process performed by the scanner reading unit 21 is terminated. Therefore, even when the image forming apparatus 100 performs the printing process prior to the reading process, an execution of scanner reading and an execution of plotter printing are notified to the image-data I/O process executing unit 14 in parallel.

Figure 7B:
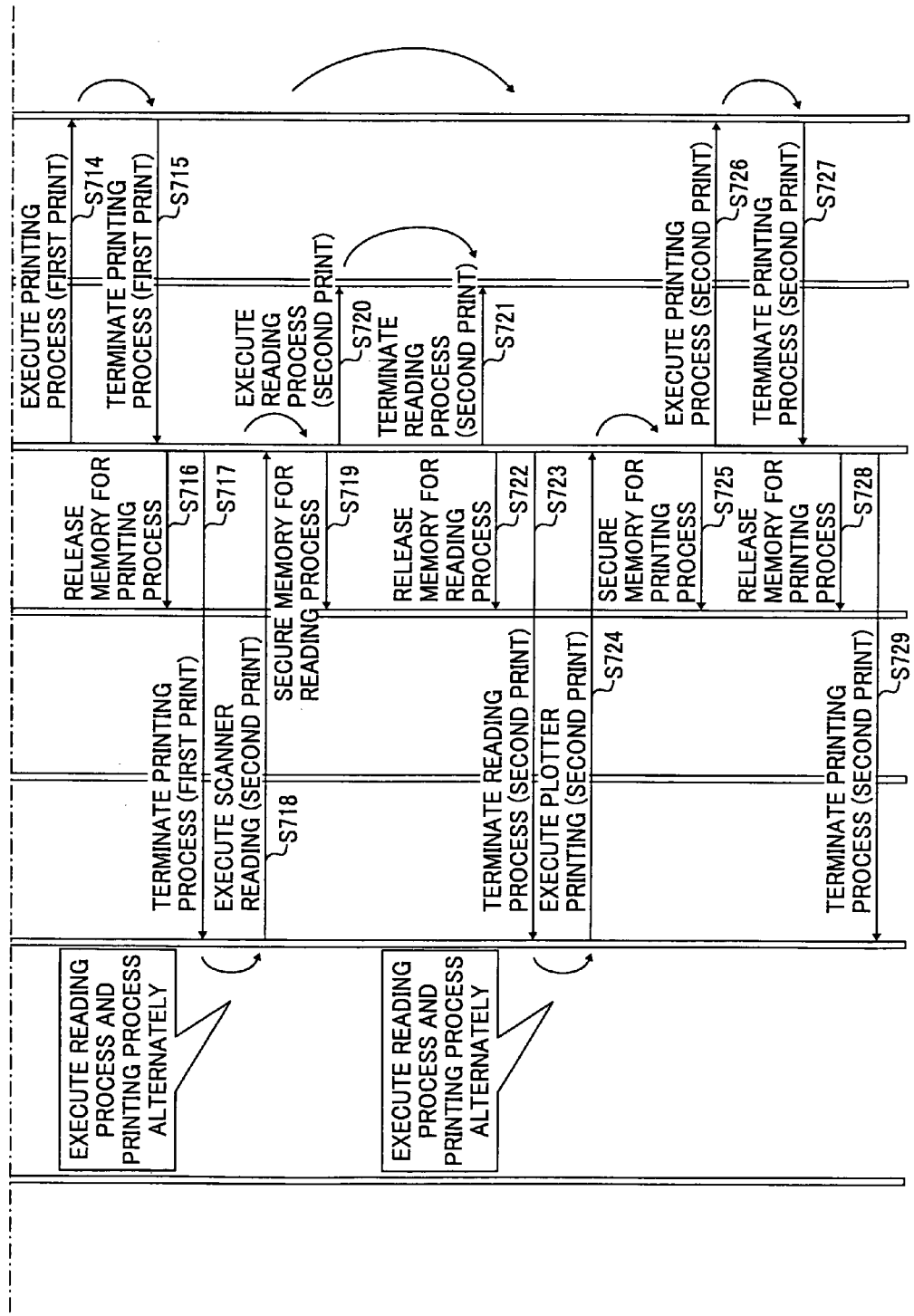
FIG. 7 is a flowchart for explaining a case where the image forming apparatus alternately performs the input process (the reading process) and the output process (the printing process).

FIG. 7 is a flowchart for explaining a case where the image forming apparatus 100 alternately performs the input process (the reading process) and the output process (the printing process). Processing procedures at steps S701 to S704 are identical to those at steps S301 to S304 in FIG. 3, so that the description of those procedures is omitted. When the execution-condition determining unit 12 determines that the process cannot be executed in the normal processing mode, the execution-condition determining unit 12 notifies the execution-request receiving unit 11 of a result of the determination (step S705). Upon receiving the result from the execution-condition determining unit 12, the execution-request receiving unit 11 notifies the image-data I/O process executing unit 14 of an execution of scanner reading (for the first print) at first (step S706). After a memory for reading the first print is secured (step S707), the image-data I/O process executing unit 14 instructs the scanner reading unit 21 to execute reading the first print (step S708). Upon termination of the reading process for the first print (step S709), the memory for reading the first print is released (step S710). Then, the image-data I/O process executing unit 14 notifies the execution-request receiving unit 11 of the termination of the reading process for the first print (step S711). When the execution-request receiving unit 11 is notified of the termination of the reading process for the first print, the execution-request receiving unit 11 instructs the image-data I/O process executing unit 14 of an execution of plotter printing (for the first print) next (step S712). Processing procedures at steps S713 to S716 are identical to those at steps S310, S311, S314, and S315 in FIG. 3, so that the description of those procedures is omitted. When the execution-request receiving unit 11 is notified of the termination of the printing process for the first print (step S717), the execution-request receiving unit 11 instructs the image-data I/O process executing unit 14 of an execution of scanner reading (for the second print) (step S718). Processing procedures at steps S719 to S729 are identical to those at steps S707 to S717 for the first print, so that the description of those procedures is omitted. In this manner, the reading process and the printing process are alternately executed until the reading process and the printing process for the last print are terminated.

As a variation of the low-speed processing mode, the reading process and the printing process can be switched depending on a size of image data in addition to the preferential processing.

In this case, when first image data is read by the scanner reading unit 21, if a size of the first image data is smaller than a predetermined size, the first image data is printed by the plotter printing unit 22 without being saved in the HDD 16. If the size of the first image data is larger than the predetermined size, the first image data is saved in the HDD 16, and printed by the plotter printing unit 22 later on.

Furthermore, if a size of output data of the first image data is below a threshold, second image data is read by the scanner reading unit 21 while the first image is being printed. If the size of the output data exceeds the threshold, second image data is read by the scanner reading unit 21 after the first image is printed.

In the above embodiment, the scanner and the plotter are respectively used as an input destination and an output destination of image data, but the present invention is not limited to the scanner and the plotter. As the input destination and the output destination, it is also applicable to a printer, a facsimile (via a phone line), a World Wide Web (Web) application, an image storage medium (a secure digital (SD) card or the like), and a document box stored in the HDD. In addition, as the output destination, it is further applicable to e-mail (via a network).

Alternatively, in a case where the image forming apparatus 100 is connected to a plurality of input/output devices as described above, an output process to the plotter or the facsimile and an input process from the scanner or the printer can be performed prior to other input/output processes in addition to the input preferential processing or the output preferential processing as described above. Furthermore, a combination of the scanner as the input destination and the plotter as the output destination or a combination of the printer as the input destination and the plotter as the output destination can be performed prior to other input/output processes.

Alternatively, the low-speed processing mode can be selected in the following cases [A] to [C].

[A] In a Particular Mode

In a case where an undefined size of image data is specified to be input, it is determined that a memory to be used for the image data may be insufficient because an actual size of the image data is unknown. Therefore, the processing speed is degraded.

In a case where a paper size (a length, a width, a dimension, and a size code) exceeding a predetermined value is specified, the maximum memory size to be used for the image data can be calculated. If it is determined that a free memory is insufficient for the calculated maximum memory size, the processing speed is degraded.

In a case where a paper size larger than that of the most-commonly used paper (such as an A4-size paper in Japan, or a letter-size paper in the US) is specified, the processing speed is degraded because a memory may be insufficient.

In a case where a paper size larger than the largest defined paper size (such as an A3 size, a double-letter size, or a full-bleed A3 size), which can be specified in the image forming apparatus 100 typically, is specified, the processing speed is degraded because a memory may be insufficient.

In a case where an image-prior mode for enhancing an image quality is specified, an image is sized up to increase the resolution. Therefore, the processing speed is degraded because a memory may be insufficient.

In a case where a preview image is checked when an image is input, a memory is used for the preview image in addition to the input image. Therefore, the processing speed is degraded because a memory may be insufficient.

In a case where a direction of an input image is different from that of a transfer paper when the image is printed out (i.e., the image is rotated at an execution of printing), an extra memory is required for the rotation process. Therefore, the processing speed is degraded because a memory may be insufficient.

In a case of an image processing mode (such as combining, stamping, watermarking, image compositing, zooming, mirror printing, masking, color conversion, and the like), a memory for editing is required for processing an image. Therefore, the processing speed is degraded because a memory may be insufficient.

[B] In a Case where Particular Data is Input

In a case where non-compressed RGB image data is input to the image forming apparatus 100, a data size of the non-compressed RGB image data is larger than that of cyan-magenta-yellow-black (CMYK) image data. Therefore, the processing speed is degraded. According to the embodiment of the present invention, a data size of versatile RGB image data is large, so that the RGB image data is compressed by using an encoding method such as a JPEG to reduce the data size, and thereby reducing a memory size required for the RGB image data. However, in a case where RGB image data cannot be compressed depending on a condition, the non-compressed RGB image data is referred to as particular data.

In a case where image data is composed of data input from a plurality of data input devices, such as a scanner and an HDD, or a facsimile and a personal computer (PC), the processing speed is degraded.

[C] In a Case where Particular Data is Output

In a case where non-compressed RGB image data is output, an image size of the non-compressed RGB image data is larger than that of a CMYK image data. Therefore, the processing speed is degraded because a memory may be insufficient.

In a case where image data is output to a plurality of data output devices, such as a plotter and an HDD, or a facsimile and a PC, the processing speed is degraded.

Furthermore, when a free memory is sufficient, it is not necessary to execute an image-data input/output process in the low-speed processing mode. Therefore, either the normal processing mode or the low-speed processing mode can be selected depending on a capacity and the number of the HDD, and a capacity of the RAM those included in the image forming apparatus. Moreover, either the normal processing mode or the low-speed processing mode can be selected based on a combination of some of the above conditions accordingly.

The image data is based on an image format capable of changing a data size depending on a situation. The image format is a compressed variable-length format.

According to an aspect of the present invention, the image forming apparatus can switch processing modes between the normal processing mode and the low-speed processing mode depending on a condition for inputting/outputting image data. Therefore, if the condition does not fulfill the speed-degradation condition, the image forming apparatus switches to the normal processing mode so that the job productivity of the image forming apparatus can be improved. On the other hand, if the condition fulfills the speed-degradation condition, the image forming apparatus switches to the normal processing mode so that a process of inputting/outputting image data can be executed efficiently.

According to another aspect of the present invention, if the image forming apparatus cannot perform an image-data input process in parallel with an image-data output process due to structural limits of the apparatus, the image forming apparatus can perform the image-data input process prior to the image-data output process.

According to still another aspect of the present invention, if the image forming apparatus cannot perform the image-data input process in parallel with the image-data output process due to structural limits of the apparatus, the image forming apparatus can perform the image-data output process prior to the image-data input process.

According to still another aspect of the present invention, if the image forming apparatus cannot perform the image-data input process in parallel with the image-data output process due to structural limits of the apparatus, the image forming apparatus can alternately perform the image-data output process and the image-data input process.

According to still another aspect of the present invention, if the image forming apparatus cannot perform the image-data input process in parallel with the image-data output process due to structural limits of the apparatus, the image forming apparatus can perform the image-data output process and the image-data input process in the input order.

According to still another aspect of the present invention, if the image foaming apparatus cannot efficiently perform the image-data input process in parallel with the image-data output process, the image forming apparatus can perform the image-data input process as a priority.

According to still another aspect of the present invention, if the image forming apparatus cannot efficiently perform the image-data input process in parallel with the image-data output process, the image forming apparatus can perform the image-data output process as a priority.

According to still another aspect of the present invention, if the image forming apparatus cannot perform the image-data input process in parallel with the image-data output process due to a limit of a memory size, the image forming apparatus can control a memory usage so as to perform the image-data output process and the image-data input process.

According to still another aspect of the present invention, the image forming apparatus can resolve a memory shortage due to a selection of a particular mode. Processing procedures for inputting/outputting particular data in the particular mode are defined in a predetermined manner, so that it is possible to achieve the user-friendly image forming apparatus.

According to still another aspect of the present invention, processing procedures for selecting the particular mode are defined in a predetermined manner, so that it is possible to achieve the user-friendly image forming apparatus.

According to still another aspect of the present invention, processing procedures for inputting particular data are defined in a predetermined manner, so that it is possible to achieve the user-friendly image forming apparatus.

According to still another aspect of the present invention, processing procedures for outputting particular data are defined in a predetermined manner, so that it is possible to achieve the user-friendly image forming apparatus.

According to still another aspect of the present invention, a capacity of a storage unit can be changed with respect to a user's needs.

According to still another aspect of the present invention, image data is based on an image format capable of changing a data size depending on a situation. Therefore, the image forming apparatus can perform the image-data input process in parallel with the image-data output process efficiently, and thereby improving the job productivity of the image forming apparatus.

According to still another aspect of the present invention, the image forming apparatus can perform the image-data input process in parallel with the image-data output process even if image data is compressed into a variable-length format.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
a storage unit that temporarily stores therein first image data input from an input device and second image data to be output to an output device;
an image-data input/output processing unit that performs processes of inputting the first image data from the input device and outputting the second image data to the output device; and
an execution-condition determining unit that determines a condition for the processes of inputting and outputting the image data, and switches processing modes between a normal processing mode and a low-speed processing mode based on a determined condition, wherein
if the condition does not fulfill a speed-degradation condition for determining whether predetermined areas for the image data can be secured in the storage unit, the execution-condition determining unit switches to the normal processing mode in which an input-related area and an output-related area for the image data are secured in the storage unit,
if the condition fulfills the speed-degradation condition, the execution-condition determining unit switches to the low-speed processing mode in which either one of the input-related area and output-related area for the image data is partially or fully secured after releasing an area secured in a last process; and
wherein when the output device is a plotter, the execution-condition determining unit secures an area required for outputting the second image data in the storage unit prior to securing an area required for inputting the first image data in the storage unit.

2. The image forming apparatus according to claim 1, wherein when performing the processes of inputting and outputting the image data in the low-speed processing mode, the execution-condition determining unit secures an area required for inputting the first image data in the storage unit prior to securing an area required for outputting the second image data in the storage unit.

3. The image forming apparatus according to claim 1, wherein when performing the processes of inputting and outputting the image data in the low-speed processing mode, the execution-condition determining unit secures an area required for outputting the second image data in the storage unit prior to securing an area required for inputting the first image data in the storage unit.

4. The image forming apparatus according to claim 1, wherein when performing the processes of inputting and outputting the image data in the low-speed processing mode, the execution-condition determining unit causes the processes of inputting and outputting the image data to be performed alternatively by securing a first area required for storing predetermined data when inputting the first image data in the storage unit, releasing the first area upon termination of the process of inputting the first image data, securing a second area required for storing predetermined data when outputting the second image data in the storage unit, and releasing the second area upon termination of the process of outputting the second image data.

5. The image forming apparatus according to claim 1, wherein when the condition fulfills the speed-degradation condition, it is estimated that a memory usage exceeds a predetermined threshold.

6. The image forming apparatus according to claim 1, wherein when the condition fulfills the speed-degradation condition, it indicates any one of cases where a particular mode is selected, particular data is input, and particular data is output.

7. The image forming apparatus according to claim 6, wherein the particular mode is any one of a mode in which an undefined paper size is specified, a mode in which a paper size larger than a defined paper size is specified, an image-quality prior mode, a preview-attached mode, an image-rotation printing mode, and an image-quality processing mode.

8. The image forming apparatus according to claim 6, wherein the particular data is either one of non-compressed RGB image data and data input from a plurality of input devices.

9. The image forming apparatus according to claim 6, wherein the particular data is any one of non-compressed RGB image data, high-resolution image data, and data to be output to a plurality of output devices.

10. The image forming apparatus according to claim 1, wherein the speed-degradation condition dynamically changes depending on either one of a capacity of the storage unit and number of storage units.

11. The image forming apparatus according to claim 1, wherein the image data has an image format capable of changing a data size depending on a situation.

12. The image forming apparatus according to claim 11, wherein the image format is a compressed variable-length format.

13. A method of controlling inputting and outputting image data:
   processing inputting image data from an input device and outputting image data to an output device; and
   determining including determining a condition for processes of inputting and outputting the image data, and switching processing modes between a normal processing mode and a low-speed processing mode based on a determined condition, wherein
   if the condition does not fulfill a speed-degradation condition for determining whether predetermined areas for the image data can be secured in the storage unit, the determining includes switching to the normal processing mode in which an input-related area and an output-related area for the image data are secured in the storage unit,
   if the condition fulfills the speed-degradation condition, the determining includes switching to the low-speed processing mode in which either one of the input-related area and output-related area for the image data is partially or fully secured after releasing an area secured in a last process; and
   wherein when the output device is a plotter, the execution-condition determining unit secures an area required for outputting the second image data in the storage unit prior to securing an area required for inputting the first image data in the storage unit.

14. An image forming apparatus comprising:
   a storing means for temporarily storing therein first image data input from an input device and second image data to be output to an output device;
   an image-data input/output processing means for performing processes of inputting the first image data from the input device and outputting the second image data to the output device; and
   an execution-condition determining means for determining a condition for the processes of inputting and outputting the image data, and switching processing modes between a normal processing mode and a low-speed processing mode based on a determined condition, wherein
   if the condition does not fulfill a speed-degradation condition for determining whether predetermined areas for the image data can be secured in the storing means, the execution-condition determining means switches to the normal processing mode in which an input-related area and an output-related area for the image data are secured in the storing means,
   if the condition fulfills the speed-degradation condition, the execution-condition determining means switches to the low-speed processing mode in which either one of the input-related area and output-related area for the image data is partially or fully secured after releasing an area secured in a last process; and
   wherein when the output device is a plotter, the execution-condition determining unit secures an area required for outputting the second image data in the storage unit prior to securing an area required for inputting the first image data in the storage unit.

* * * * *